United States Patent
Al-Banna

(10) Patent No.: US 9,391,819 B1
(45) Date of Patent: Jul. 12, 2016

(54) SYSTEMS AND METHODS FOR PREVENTING ENERGY LEAKAGE IN COMMUNICATIONS SYSTEMS

(71) Applicant: ARRIS Enterprises, Inc., Suwanee, GA (US)

(72) Inventor: Ayham Al-Banna, Orland Park, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/581,176

(22) Filed: Dec. 23, 2014

(51) Int. Cl.
*H03H 7/40* (2006.01)
*H04L 25/03* (2006.01)

(52) U.S. Cl.
CPC ................ *H04L 25/03878* (2013.01)

(58) Field of Classification Search
CPC ............. H04L 25/03057; H04L 25/03038; H04L 10/0791; H04L 10/25751
USPC ............... 375/229, 231, 232, 235, 260, 346; 708/322, 323
See application file for complete search history.

(56) References Cited

U.S. PATENT DOCUMENTS

| | | | |
|---|---|---|---|
| 8,817,865 B2* | 8/2014 | Currivan | H04L 25/022 375/229 |
| 2010/0316111 A1* | 12/2010 | Berscheid | H04L 25/03038 375/232 |
| 2013/0010810 A1* | 1/2013 | Pelet | H04B 1/1036 370/479 |
| 2015/0311974 A1* | 10/2015 | Thompson | H04B 10/25751 398/13 |

OTHER PUBLICATIONS

"DOCSIS® Best Practices and Guidelines: Proactive Network Maintenance Using Pre-equalization", Document CM-GL-PNMP-V02-110623, Cable Television Laboratories, Inc., Jun. 2011.

* cited by examiner

*Primary Examiner* — Khai Tran
(74) *Attorney, Agent, or Firm* — Lori Anne D. Swanson

(57) ABSTRACT

Systems and methods for reducing interference between CATV devices at subscribers' premises.

12 Claims, 6 Drawing Sheets

SYSTEMS AND METHODS FOR PREVENTING ENERGY LEAKAGE IN COMMUNICATIONS SYSTEMS

CROSS-REFERENCE TO RELATED APPLICATIONS

None

BACKGROUND

The present disclosure relates to systems and methods that provide signals over a cable transmission network.

Cable television (CATV) networks have evolved significantly since first being deployed as relatively simple systems that delivered video channels one-way from a content provider. These early systems included transmitters that assigned a number of CATV channels among several frequency bands, each of approximately 6 MHz, multiplexed those signals, and sent them to subscribers as an electrical signal through a network of coaxial transmission lines to cable modems or set-top boxes in subscribers homes. Early evolution of such systems permitted limited return communication from the subscribers back to the content provider either through telephone lines or a dedicated, small, low-frequency signal propagated onto the coaxial network.

Modern CATV networks differ from these early networks in several material respects. First, given the growth of content provided to customers over increasing distances, much of the coaxial transmission path has been replaced by fiber-optic lines, although the trunk lines and feeder cables to customer homes remain coaxial, and much of the content delivered to the provider for transmission is by an analog electrical signal that the provider must then convert to an optical signal for propagation onto the coaxial transmission grid. Nodes, located closer to the subscribers receive the optical signals from the transmitter and convert them to the electrical signals for delivery to the subscribers through the coaxial lines to the subscribers' homes. Such a network is commonly referred to as a Hybrid Fiber-Coax (HFC) system.

Second, in addition to delivering television content, modern HFC systems also deliver additional content including Video-on Demand (VOD) and data services such as Internet access. These services require not only a high-capacity transmission path in the direction from the content provider to the subscriber but require a high capacity transmission path in the direction from the subscriber back to the content provider. Additional quality is needed both for new high definition broadcast channels and for the narrowcast video and data services. The original HFC network has been successfully updated to deliver new services, but the pressure of HD, VOD, and data service requires further advances, thus there is significant continuing pressure to increase the quality of data sent over a HFC network.

DETAILED DESCRIPTION

Physically, existing downstream CATV content originates on the network from a head end, within which is a Cable Modem Termination System (CMTS). In the CMTS there is typically a plurality of EdgeQAM units, which each receive encoded video signals, audio signals, and/or IP signals, and which each directly output a spectrum of amplitude-modulated analog signals at a defined frequency or set of frequencies to an RF combining network. The RF combining network in turn delivers the combined, modulated signals to a transmitter that converts the analog signals to optical signals and propagates those signals to a fiber optic network along a forward path to a receiver in a node. The node, in turn, converts the received optical signals back into electrical signals so that they may be delivered to subscribers through coaxial cables that terminate in the subscriber's homes. The node, conversely will also have equipment capable of receiving electrical signals from the subscribers, converting them to optical signals, and sending the optical signals to the CMTS along the fiber optic network, where the head end has a receiver capable of decoding and converting the signals back to the analog domain, respectively.

In the specification, the drawings, and the claims, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end. Also, it should be understood that, unless stated otherwise, the term "head end" will also encompass a "hub," which is a smaller signal generation unit remote from a head end, often used for community access channel insertion and other purposes, that generally mimics the functionality of a head end, but may typically not include equipment such as satellite dishes and telephone equipment.

Figure 1:
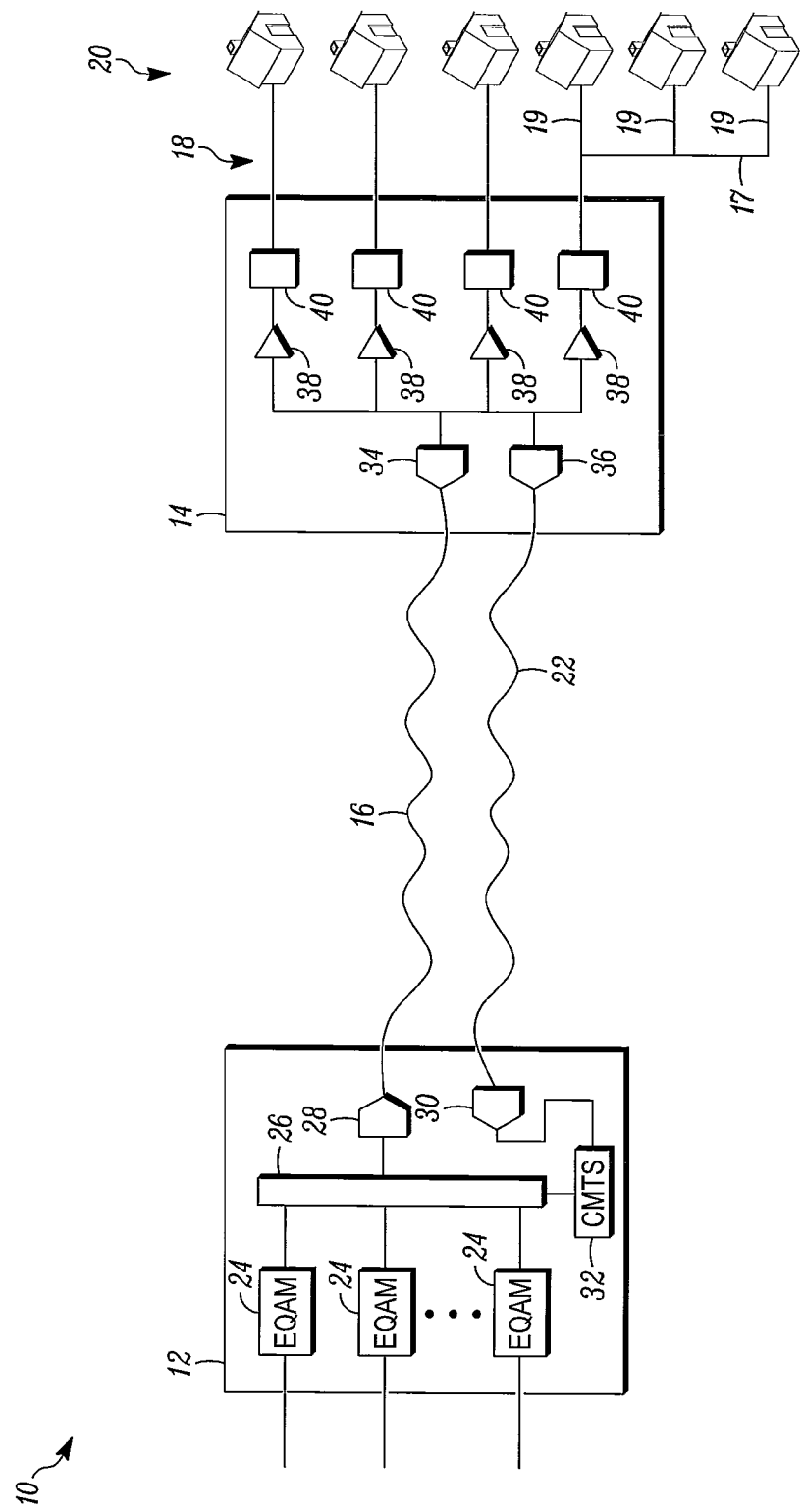
FIG. 1 shows an exemplary HFC network from a head end to a node that serves a plurality of home subscribers.

Referring to FIG. 1, a CATV Hybrid Fiber-Coaxial (HFC) network 10 may include a head end 12 that delivers content over a forward path to a node 14 using an optical transmission line 16. The node 14 may in turn deliver content to a plurality of subscribers 20 over a coaxial network 18. Subscriber's homes are typically connected to the node 14 using trunk cables 17 and feeder cable or "taps" 19. The HFC network 10 may likewise transmit signals over a return path from each of the subscribers 20 to the node 14 through the coaxial network 18, which in turn transmits the return path signal to the head end 12 through an optical transmission line 22.

The head end 12 may preferably modulate a plurality of cable channels using one or more EdgeQAM units 24. The respective channels may be combined by an RF combining network 26 that multiplexes the signals and uses the multiplexed signal to modulate an optical transmitter 28 (e.g., a laser) that delivers the optical signal to transmission line 16. The head end 12 may also include an optical receiver 30 that receives return path signals from the optical transmission line 22 and delivers the return path signals to a Cable Modem Termination System (CMTS) 32, which instructs each of the cable modems when to transmit return path signals, such as Internet protocol (IP) based signals, and which frequency bands to use for return path transmissions. The CMTS 32 demodulates the return path signals, translates them into (IP) packets, and redirects them to a central switch (not shown) that transmits the IP packets to an IP router for transmission across the Internet. It should be understood by those skilled in the the art that this configuration may be modified in any number of manners. For example, one or more of the EQAM units may be analog modulated or digitally modulated, or may be directly modulated in a Converged Cable Access Platform (CCAP). Similarly, the head end may include an A/D converter between the RF combining network 26 and the optical transmitter 28 so as to modulate the optical signal to the node using a digital rather than an analog signal.

The node 14 includes an optical receiver 34 to receive a forward path signal from the head end 12 over the optical transmission line 16, along with an optical transmitter 36 to send the return path signals to the head end 12 over the optical transmission line 22. The optical receiver 34 is preferably capable of demultiplexing a received optical signal and using the demultiplexed signals to modulate respective RF signals sent to subscribers 20 through a network of amplifier units 38 and diplexers 40.

Figure 2:
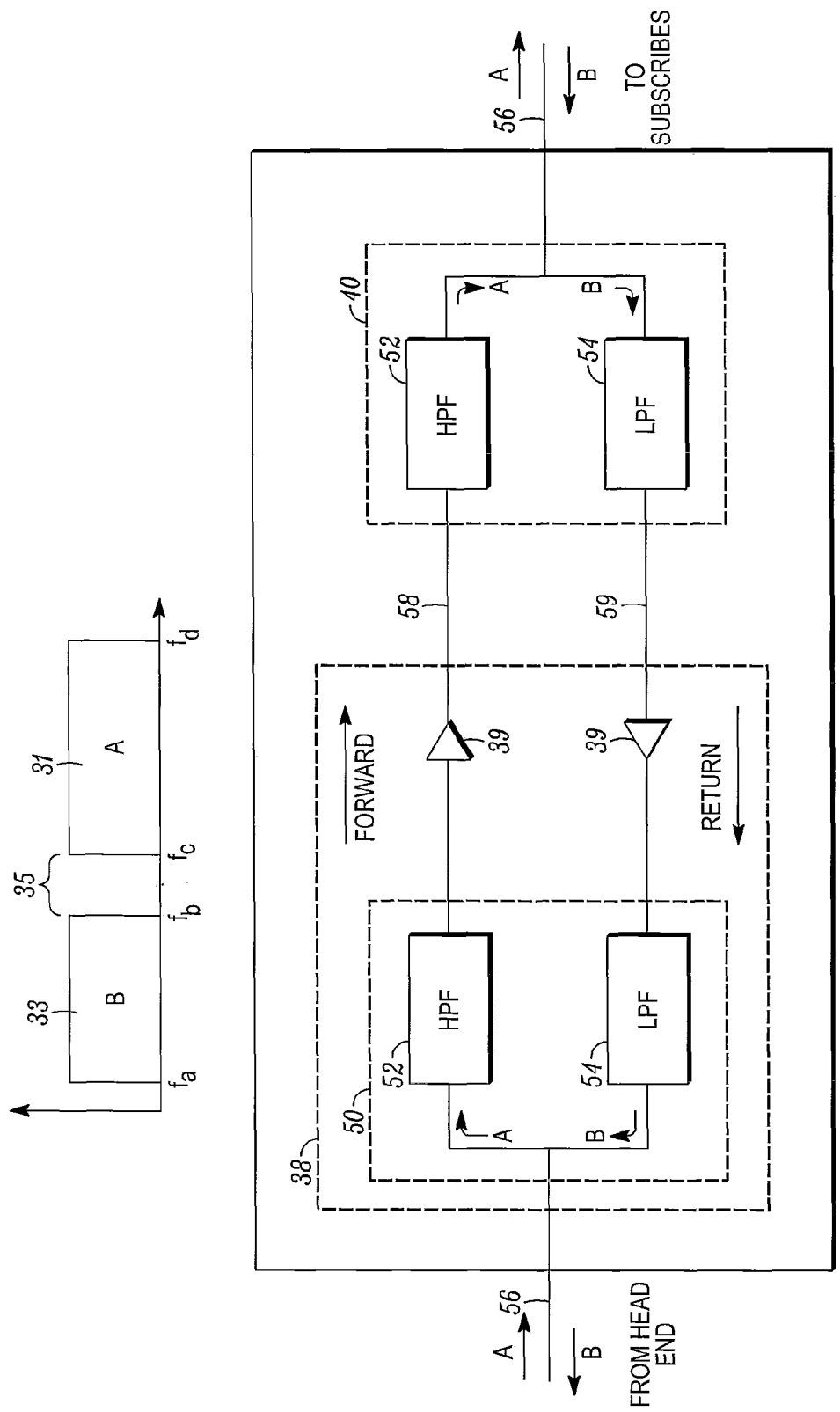
FIG. 2 schematically shows a CATV amplifier/diplex filter implementing a split frequency transmission along both a forward and reverse path.

As noted previously, the respective RF signals communicated between the node 14 and the subscribers 20 include both forward path and reverse path transmissions, both typically carried over a common coaxial cable. Referring to FIG. 2, to carry forward and return path signals over the same coaxial cable, different bands 31 and 33 of the RF spectrum are assigned to each of the forward path (high band) and the return path (low band), and are typically separated by a guard band 35 to prevent signal interference between the respective signals.

As can be appreciated from FIG. 1, the node 14 must be capable of separately processing the forward and return path signals that are propagated on the same coaxial cable. In FIG. 1 for example, CATV amplifiers such as the amplifier units 38 amplify the forward path signal and the return path signal simultaneously. Thus, the amplifier units 38 may typically be operatively connected to a minimum of two diplex filters—a first diplex filter that separates the return path from the forward path, after which these RF signals are separately amplified, and then a second diplex filter (e.g. diplexers 40) that recombines the separated signals onto a common coaxial cable sent to a subscriber 20 or to a head end.

FIG. 2 schematically shows an exemplary circuit utilizing an amplifier unit 38 having a diplex filter 50 that includes a high pass filter 52 and a low pass filter 54. A common coaxial cable 56 carrying both an upper band signal (denoted as "A" in the figure) and a lower band signal (denoted as "B") is connected to both the high pass filter 52 and the low pass filter 54. As shown in the drawings, the high band signal "A" and the low band signal "B" are propagating in different directions though the diplex filter 50 and the coaxial cable 56, consistent with the relative directions of the forward and return path signals through the HFC network 10 of FIG. 1. The high pass filter 52 is configured to pass to transmission line 58 that part of the forward input 56 propagated within the common cable 56 that exceeds a threshold frequency, which is preferably set within the guardband of the CATV transmission system. Similarly, the low pass filter 54 is configured to pass from transmission line 59 that part of the return input propagated within the common cable 56 that does not exceed a threshold frequency, which is again preferably set within the guardband of the CATV transmission system. The frequency cutoff of the low pass filter 54 typically has a guard band with respect to the high pass filter 52 to improve crossover isolation. The greater the width of the guard band, the greater the improvement in crossover isolation, but at the expense of using additional portions of the frequency spectrum. The transmission lines 58 and 59 are preferably also coaxial cables, but as noted above, each of these respective coaxial cables will carry only one of the forward path signal and the return path signal.

The transmission lines 58 and 59 are preferably also connected to a high pass filter 52 and a low pass filter 54, respectively, in the diplexer 40. The diplexer 40 recombines the upper and lower band signals so that they may be propagated within the coaxial cable 56 that extends between the node 14 and the subscribers 20.

Figure 3:
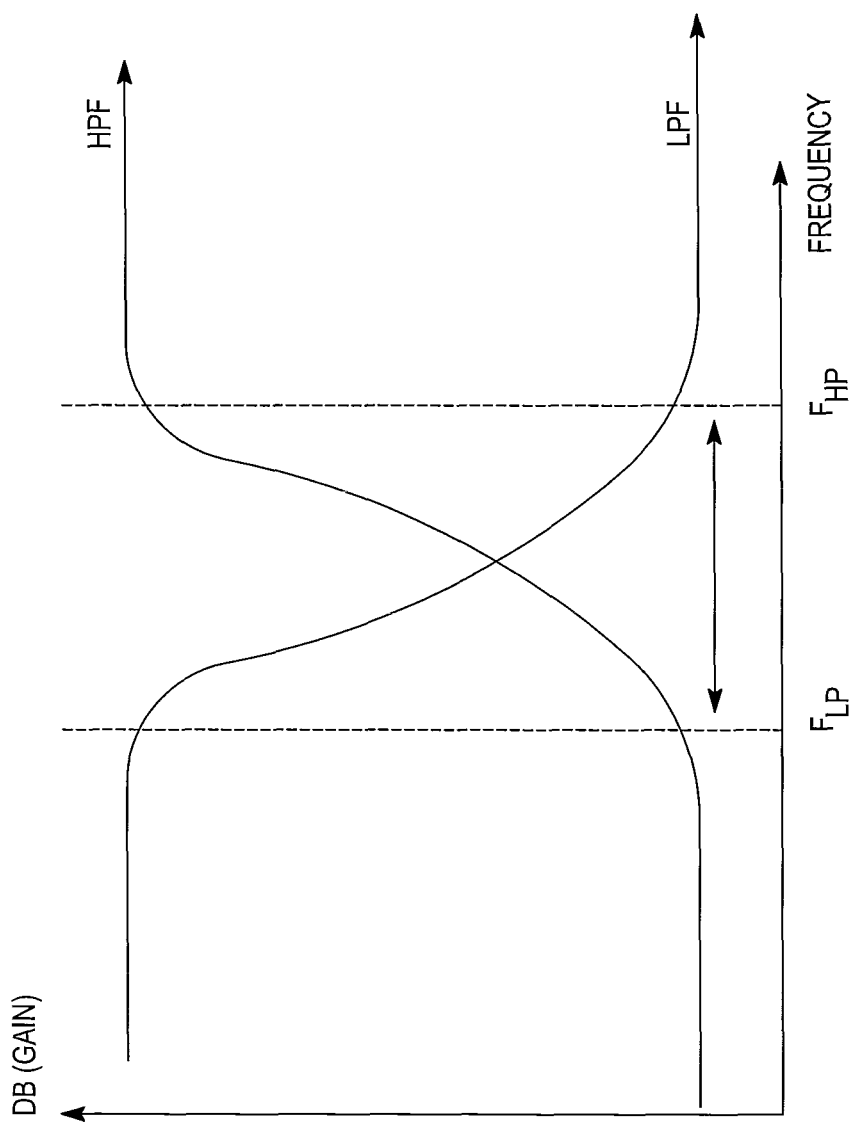
FIG. 3 shows a frequency response of the diplex filter of FIG. 2.

FIG. 3 shows a frequency plot of the diplex filter shown in FIG. 2. As can be seen in this figure, the forward path signal is preferably filtered by the high pass filter 52 to attenuate frequencies below the cutoff $f_{HP}$. Similarly, the return path signal is preferably filtered by the low pass filter 54 to attenuate frequencies above the cutoff $f_{LP}$. The frequency band between $f_{HP}$ and $f_{LP}$ preferably corresponds to the guard band between the frequency band assigned to the forward path signal and the frequency band assigned to the return path signal.

As the required bandwidth for the forward path and/or the return path changes over time when CATV broadcast systems evolve, the frequency ranges for the forward and return path will vary. For example, the DOCSIS (Data Over Cable Service Interface Specifications) 1.x standard was initially released in March 1997 and called for a downstream throughput of approximately 43 Mbps and an upstream throughput of approximately 10 Mbps along a minimum of one channel, and which accordingly permitted return path frequencies within the 5-42 MHz range (low split). DOCSIS 2.0, released in late 2001 required an improved upstream throughput of approximately 31 Mbps, again for a minimum of one channel. DOCSIS 3.0, released in 2006 required that the DOCSIS 2.0 throughput standards of 43 Mbps and 31 Mbps, respectively, be provided along a minimum of four channels in each direction, and which permitted return path frequencies within the 5-85 MHz range (mid split). Looking forward, the DOCSIS 3.1 platform is aiming to support capacities of at least 10 Gbps downstream and 1 Gbps upstream using 4096 QAM, and which would permit return path frequencies to the 5-204 MHz range (high split). This new specification aims to replace the 6 MHz and 8 MHz wide channel spacing with smaller 20 kHz to 50 kHz orthogonal frequency division multiplexing (OFDM) subcarriers, which can be bonded inside a block spectrum that could end up being about 200 MHz wide.

Though the DOCSIS standards have been (and continue to be) upgraded over time, many CATV systems delivering content to customers may lag the maximum capabilities permitted by standards for a considerable period of time while equipment is gradually upgraded. For example, upstream transmissions under the current DOCSIS standard in the United States are permitted within the 5-85 MHz band, while in Europe upstream transmissions are assigned the 5-65 MHz band. Nonetheless, many CATV systems in the United States, for example, still propagate upstream content in the 5-42 MHz band with downstream content propagated in the 54-750 MHz band. It can be expected that, well into the future, content providers will continue to provide content to different devices at respectively different split frequencies between upstream and downstream transmissions, as providers are expected to gradually transition to broader spectrum assigned to both the upstream and downstream transmissions to accommodate greater demand for content and data services, such as Video on Demand and ever-increasing need for additional Internet bandwidth. For instance, content providers are now gradually upgrading particular equipment to accommodate a mid-split architecture where upstream transmissions are assigned the 5-85 MHz band, but in the future will increasingly transition equipment to a high-split architecture where upstream transmissions are assigned the 5-204 MHz band.

Figure 4:
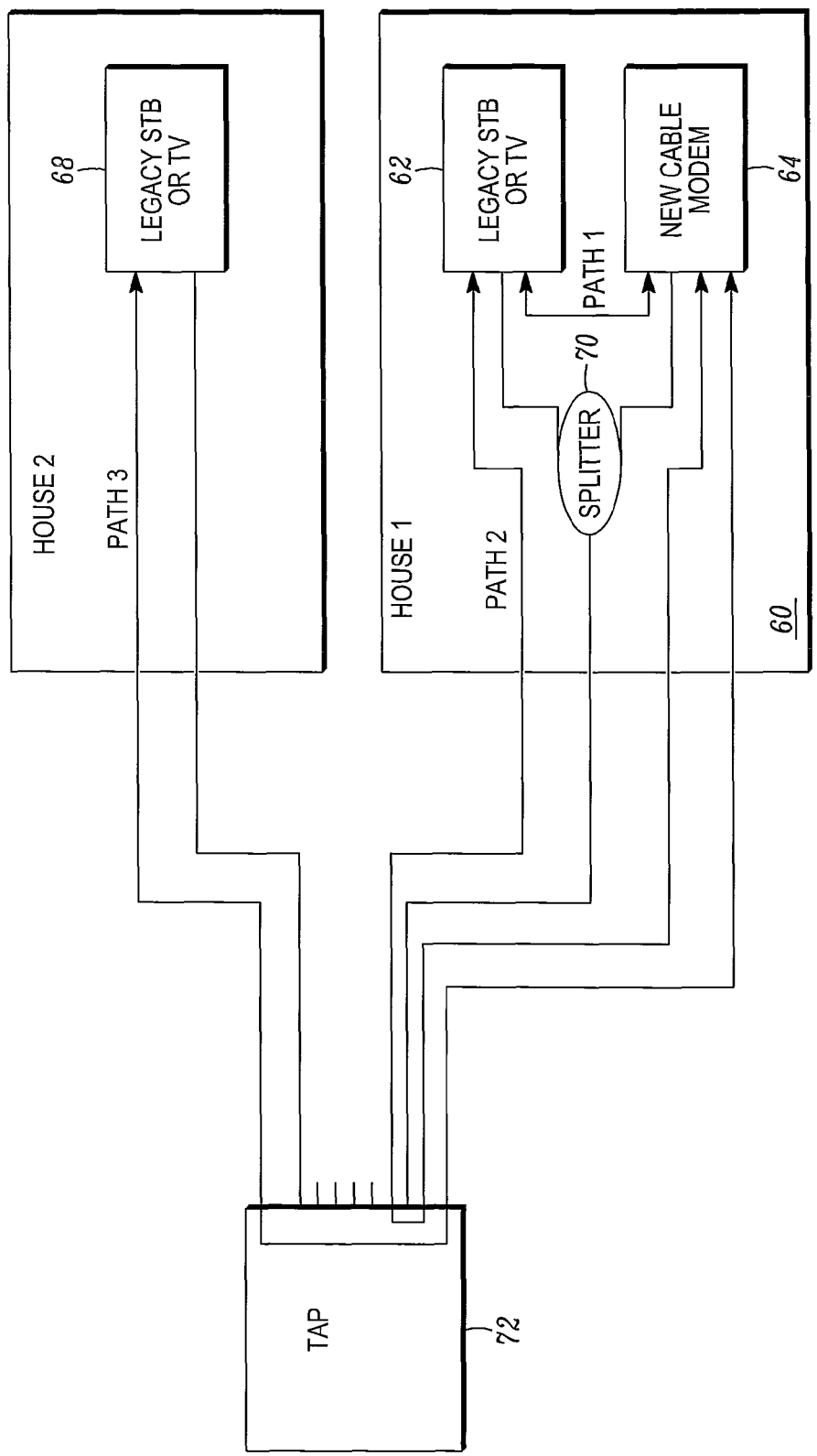
FIG. 4 illustrates interference that may be caused by a device configured to send an upstream transmission within a frequency range that overlaps a frequency range within which another device receives a downstream transmission.

Such transitions to higher splits will likely cause problems to subscribers as the high US energy transmitted from the CMs may get coupled and received by the other devices in the home that are designed to receive signals at 54 MHz frequency and above. Referring to FIG. 4, for example, a subscriber in a first house 60 who has a legacy television (TV) or set top box (STB) 62 may upgrade to a new cable modem 64 that utilizes a higher split frequency between upstream and downstream transmissions, such as 5-85 MHz mid-split, for example. Yet other devices inside the home, such as the TV/STB 62 may be configured to receive downstream transmissions in the 54-750 MHz band. Thus, the upstream energy in the 54-85 MHz band will tend to leak into and over saturate other devices inside the subscriber's home, which may have AGC circuits that react to the high power signals at the input and reduce the gain of the amplifier inside those devices which in turn will reduce the level of the desired TV signals that may have low levels already. For instance, an upstream signal emanating from the cable modem 64 may interfere with the legacy TV/STB 62 by sending an upstream signal through a first path 1 that begins at the cable modem 42, but propagates back to the TV/STB 68 via the splitter 70. Also, the TV/STB 62 could receive interference from a second path that begins at the cable modem 64, but produces a reflection that bounces off the tap 72 to again propagate back to the TV/STB 62.

Furthermore, as noted earlier, such interference is not limited to the home in which the cable modem 64 is present. For example, an upstream signal can travel along a third path that begins at the cable modem 64, but produces a reflection that bounces off the tap 72 to propagate back to a TV/STB 68 in any neighbor's home 66 served by the same tap 72 as the home 60. In a typical case, interference from this third path may produce a drop of approximately 14 db in the signal to the TV/STB 62, but in a worst case the loss could be approximately 25 dB.

Though, diplex filters exist in the CATV architecture from the head end to the node so as to separate upstream and downstream signals, but there are no diplex filters inside the home or in a tap to filter such interfering signals. Moreover, installing such diplex filters (or lowpass filters or other analogous filters) would not only be an arduous and cost-prohibitive process, but there is no guarantee that such equipment would not be subsequently misplaced or damaged by customers. In the same vein, other solutions such as the use of taps/splitters with high isolation, etc. have high cost and/or operational complexity.

Figure 5:
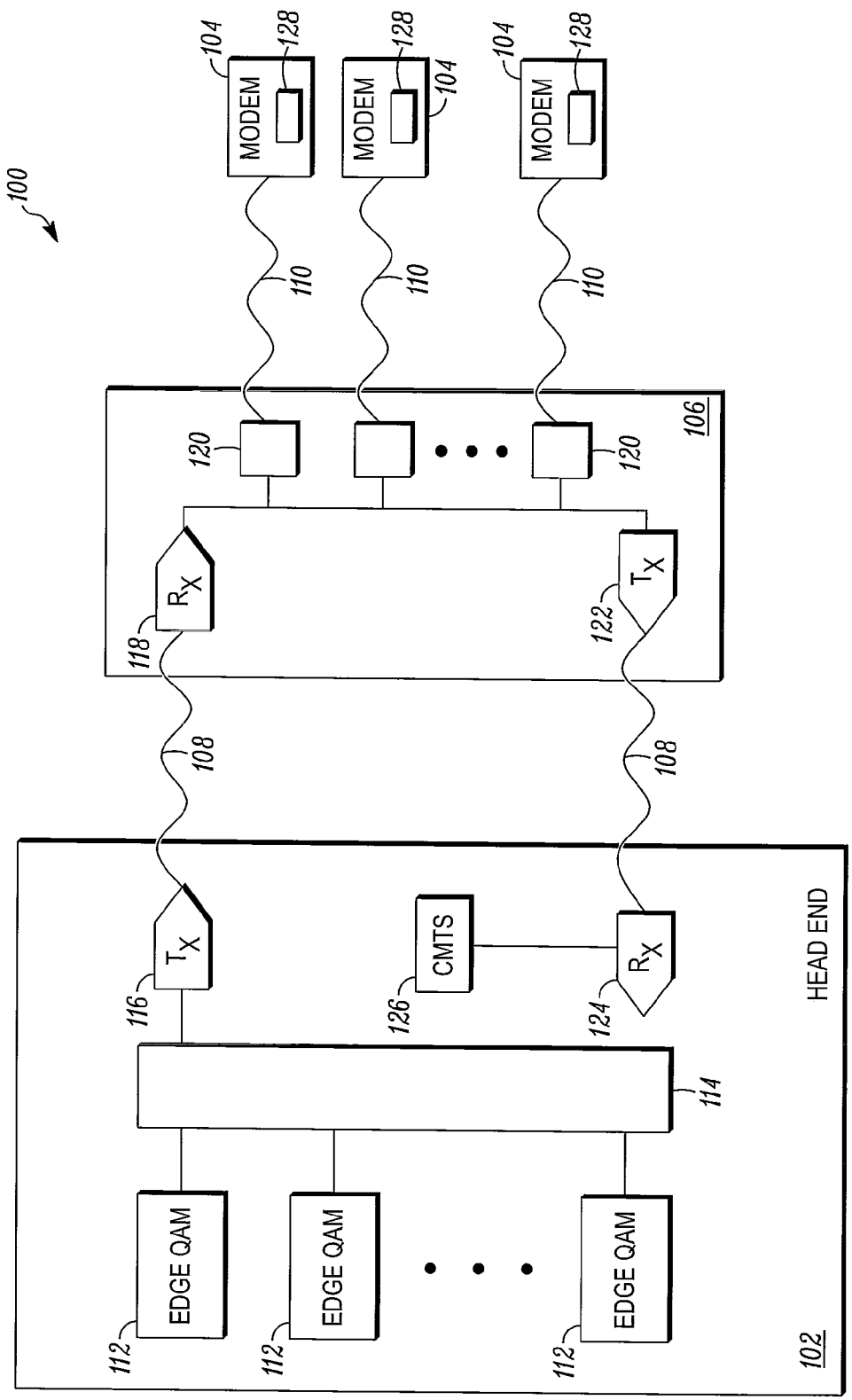
FIG. 5 shows a preferred system capable of reducing the interference shown in FIG. 4.
Figure 6:
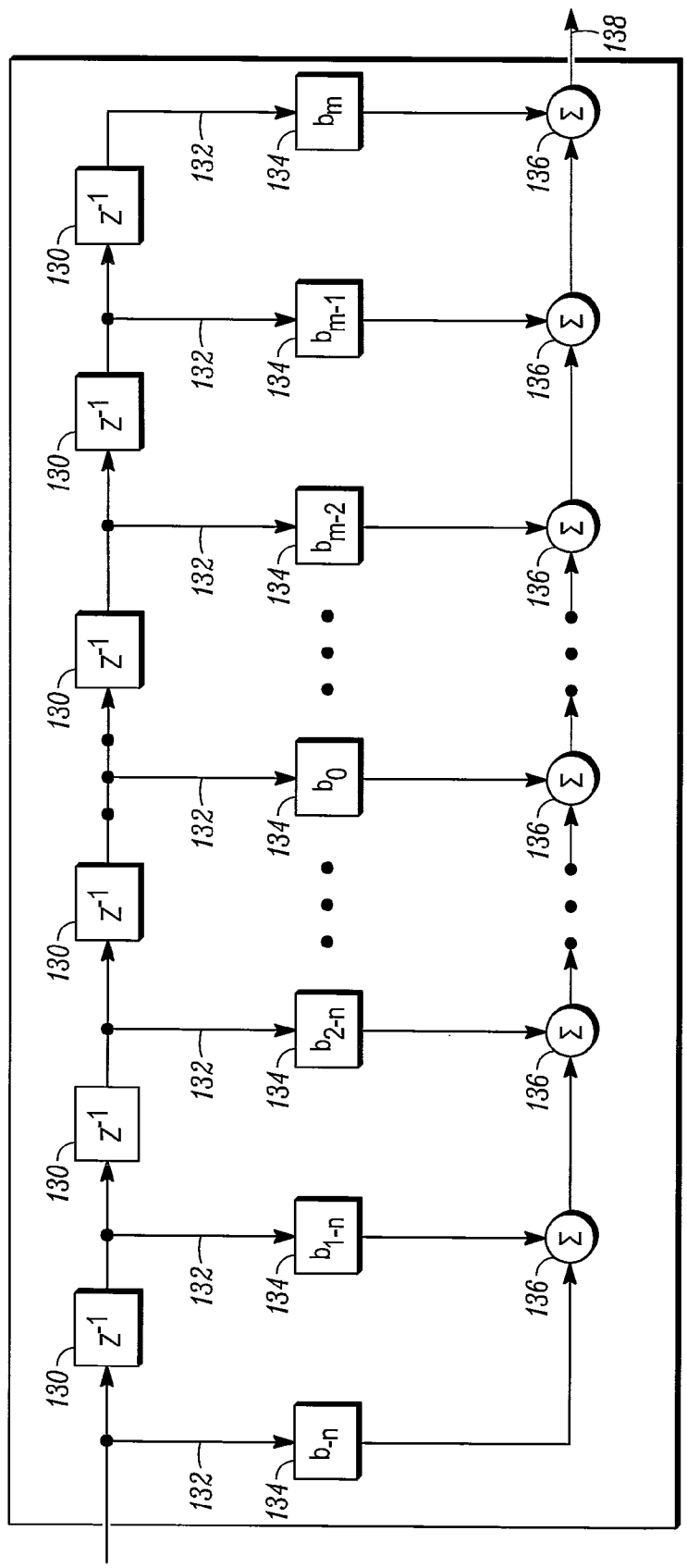
FIG. 6 shows a schematic of an illustrative pre-equalizer used in the system of FIG. 5.

FIGS. 5 and 6 show a preferred system 100 capable of reducing interference due to a mismatch between the split frequency settings of different devices. The system 100 may include a head end 102 connected to one or more cable modems 104 through a node 106 via a network comprising some combination of fiber-optic cables 108 and coaxial cables 110. The head end 102 may include a plurality of EdgeQAM units 112 or a CMTS 126 capable of modulating respective content signals (i.e. video, audio, and data content) to be delivered to customers over a forward path from the head end 102 to the modems 104. The EdgeQAM units 112 output the respective content signals to a RF combining network 114 which may multiplex the signals and propagate the content to the respective cable modems by a transmitter 116, such as a laser transmitter, which transmits a signal to a receiver 118 in the node 106. The node 106 then forwards the signals to the respective cable modems 104 through diplexers 120. The system 100 is also preferably capable of delivering return path signals from the cable modems 104 to the head end 102 through the node 106 using the node's transmitter 122 and the head end's receiver 124, which passes the return path signals to a CMTS 126 for demodulation.

The modems 104 also may preferably include one or more pre-equalizers 128. FIG. 6 schematically shows a pre-equalizer 128 having delay elements 130 after respective taps 132, each tap weighted by weights 134 which correspond to respective pre-equalization coefficients. The respectively delayed taps are summed by elements 136 to produce a pre-equalization response 138. The pre-equalizer of FIG. 6 has a number of taps equal to n+m, where n is the number of taps before the main tap $b_0$, and m is the number of taps after the main tap $b_0$. It should be understood by those skilled in the art that n and m may be varied as desired, depending on how many delay elements are desired before the main tap, and how many delay elements are desired after the main tap.

The CMTS 126 together with a respective one of the pre-equalizers 128 are preferably capable of producing a pre-equalized signal 138 that reduces the interference caused by an upstream signal sent within a frequency range that overlaps the frequency range within which a second device is configured to receive content. Specifically, the CMTS 126 preferably calculates pre-equalization coefficients to attenuate the power of upstream signals transmitted by a cable modem 64, within the frequency range that affects other devices such as the devices 62 or 68. Preferably, so as to preserve enough power in the upstream signal such that signal can be received and decoded at the head end, the pre-equalization coefficients are calculated to attenuate the power of upstream signals only to a level sufficient to achieve a specific level of interference deemed acceptable. Preferably, this level of interference is measured as the coupled signal level at the input of the device(s) receiving the downstream content, e.g. the device 62 and/or the device 68. In some embodiments, the coefficients are calculated to attenuate the power of upstream signals to achieve essentially complete attenuation, such that the corresponding portion of the upstream spectrum is not usable. This may be useful as a technique to alternately switch on and off the frequency band of the upstream transmission without needing to install new hardware, saving cost and achieving low operational complexity.

In some embodiments, the pre-equalization coefficients are calculated so as to reduce upstream power to a preselected power level in the upstream signal, where that power level is the minimum power level at which signal can be received and decoded at the head end. In some embodiments, a preselected amount of overhead may be added to this minimum power level. In other embodiments, a combination of these techniques may be used, such as reducing the power in an upstream signal to either a power level that achieves an acceptable level of interference, or a predetermined minimum power level, whichever is greater. Furthermore, if the head end 102 and/or the cable respectively applicable modem 104 is compliant with the DOCSIS 3.1 standard, then variable bit loading may be employed to compensate for lower power levels caused by the pre-equalization coefficients.

Using pre-equalization coefficients to reduce interference beneficially avoids the need for physical filters to be installed in the homes or in the networks, which saves significant expense and operational complexities. Although reducing the power of return path signals may entail some performance degradation that may occur to the signals/subcarriers that are scaled down using the foregoing techniques and systems, such a solution is certainly no worse than the alternative of inserting a physical filter in the system that limits the power of those frequencies. Moreover, the foregoing techniques to reduce interference can be completely implemented via software on the CMTS, and irrespective of whether the head end 102 conforms to DOCSIS 3.1 or merely DOCSIS 3.0. In DOCSIS 3.0 systems, for example, the CMTS can transform the calculated pre-equalization coefficients into the frequency domain and then scale them as needed and then transform them into time domain to send them to the cable modem 64. In DOCSIS 3.1 systems, alternatively, the CMTS scales the coefficients directly because OFDM signals use frequency-domain pre-equalization.

In one preferred embodiment, the CMTS 126 computes the pre-equalization coefficients and sends them to a pre-equalizer 128 in the cable modem 104 producing the signal that causes interference. Most cable modems already include pre-equalizers that are used to compensate for channel distortions and micro-reflections that occur in the CATV network. This procedure can easily be implemented by any existing cable modem having a pre-equalizer because such cable modems are already configured to simply use pre-equalization coefficients from the CMTS without changing them.

In some embodiments, the head end 102 may monitor the cable modems to which it is connected so as to selectively enable a power reduction mode to an individual cable modem, or disable that power reduction mode. For example, referring to FIG. 4, in one embodiment, the head end 102 may determine that neither the legacy TV/STB 62 nor the legacy TV/STB box 68 is powered on (or alternatively that there is no STB at the premises or otherwise connected to the tap that receives a downstream signal that would be degraded by an upstream transmission of the cable modem), yet the cable modem is delivering upstream signals relating to Internet service. In that case, the head end 102 may disable the power reduction mode. Alternatively, if the head end 102 determines that either one of the legacy TV/STB 62 or the legacy TV/STB box 68 is powered on, the head end 102 may enable the power reduction mode. In an alternative embodiment, the head end 102 may estimate an anticipated level of interference resulting from an upstream transmission from the cable modem 64 at the TV/STB 68, and if the estimated interference is deemed acceptable, disable a power reduction mode. If the resulting interference after disabling the power reduction mode is deemed unacceptable, the head end 102 may enable the power reduction mode.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. A system comprising:
 (a) a cable modem capable of receiving and using pre-equalization coefficients to modify an upstream signal sent by the cable modem, the upstream signal having an associated first frequency range; and
 (b) a head end having a cable modem termination system (CMTS) that calculates and sends the pre-equalization coefficients to the cable modem, the respective values of the pre-equalization coefficients calculated to reduce interference caused by the upstream signal to a device configured to receive a downstream signal having an associated second frequency range that at least partially overlaps the first frequency range.

2. The system of claim 1 where the respective values of the pre-equalization coefficients are calculated based on whether the device receiving a downstream signal is on or off.

3. The system of claim 1 where the respective values of the pre-equalization coefficients are calculated based on the determined presence or absence of the device receiving a downstream signal.

4. The system of claim 3 where the respective values of the pre-equalization coefficients are calculated to reduce the interference to a preselected level.

5. The system of claim 3 where the respective values of the pre-equalization coefficients are calculated to reduce the power of the upstream signal to a preselected level.

6. The system of claim 3 where the respective values of the pre-equalization coefficients are calculated to reduce the power of the upstream signal to the lower one of: (a) a preselected power level; and (b) a power level that produced a preselected maximum amount of interference.

7. A method comprising:
 (a) determining at a cable modem termination system (CMTS) the presence of a device at a subscriber's premises that receives downstream content propagated over a first frequency range;
 (b) determining at a CMTS the presence of a cable modem at a subscriber's premises that propagates upstream content over a second frequency range that at least partially overlaps the second frequency range;
 (c) sending pre-equalization coefficients to the cable modem, the pre-equalization coefficients calculated to reduce interference with the downstream content caused by the upstream content.

8. The method of claim 7 where the respective values of the pre-equalization coefficients are calculated based on whether the device receiving a downstream signal is on or off.

9. The method of claim 7 where the respective values of the pre-equalization coefficients are calculated to reduce the interference to a preselected level.

10. The method of claim 7 where the respective values of the pre-equalization coefficients are calculated to reduce the power of the upstream signal to a preselected level.

11. The method of claim 7 where the respective values of the pre-equalization coefficients are calculated to reduce the power of the upstream signal to the lower one of: (a) a preselected power level; and (b) a power level that produced a preselected maximum amount of interference.

12. The method of claim 7 where the respective values of the pre-equalization coefficients are used to selectively, alternately switch on and switch off the frequency band of the upstream transmission.

* * * * *